United States Patent [19]
Sheaffer

[11] Patent Number: 5,818,745
[45] Date of Patent: Oct. 6, 1998

[54] COMPUTER FOR PERFORMING NON-RESTORING DIVISION

[75] Inventor: Gad S. Sheaffer, Haifa, Israel

[73] Assignee: Intel Corporation, Santa Clara, Calif.

[21] Appl. No.: 658,933

[22] Filed: May 31, 1996

[51] Int. Cl.[6] .................................................. G06F 7/52
[52] U.S. Cl. ............................................................ 364/767
[58] Field of Search ............................................ 364/767

[56] References Cited

U.S. PATENT DOCUMENTS

| | | | |
|---|---|---|---|
| 4,939,686 | 7/1990 | Fandrianto | 364/752 |
| 5,128,891 | 7/1992 | Lynch et al. | 364/767 |
| 5,357,455 | 10/1994 | Sharangpani et al. | 364/767 |
| 5,377,135 | 12/1994 | Kuroiwa | 364/767 |
| 5,386,376 | 1/1995 | Girard et al. | 364/767 |
| 5,638,314 | 6/1997 | Yoshida | 364/767 |

OTHER PUBLICATIONS

Tan, "Uniform 2 Bits Quotients Binary Division by Carry–Save Adders" *IBM Technical Disclosure Bulletin* vol. 14 No. 11, Apr. 1972 pp. 3279–3281.

"Computer Architecture A Quantitative Approach, Second Edition", David A. Patterson and John L. Hennessy, Morgan Kaufmann Publishers, Inc., 1996.

*Primary Examiner*—David H. Malzahn
*Attorney, Agent, or Firm*—Blakely, Sokoloff, Taylor & Zafman

[57] ABSTRACT

A computer that performs division in either floating point or integer representation according to a novel algorithm in which a divisor is subtracted from a dividend to generate a first intermediate result. A shifter shifts the intermediate result by N-bits, where N is an integer and $2^N$ is equal to the radix, to obtain a remainder. A look-up table produces one or more multipliers based upon an upper-bit portion of the remainder and an upper-bit portion of the divisor. The divisor is multiplied by each of the one or more multiples to generate second intermediate results. Each of the secondary intermediate results is then subtracted from the remainder to generate one or more corresponding third intermediate results. A current quotient digit is selected as the largest multiplier which corresponds to the third intermediate result having the smallest possible value (as among all of the third intermediate results).

12 Claims, 6 Drawing Sheets

FIG. 1A $$\overset{\text{QUOTIENT}}{\overset{3}{8\overline{\smash{)}24}}}$$

DIVISOR — DIVIDEND

FIG. 1B $$1.50 \times 2^{-3} = 0.1875$$

SIGNIFICAND — EXPONENT — MANTISSA

FIG. 1C $$(S_1 \times 2^{e_1}) / (S_2 \times 2^{e_2}) =$$

$$\underbrace{(S_1 / S_2) \times 2^{(e_1 - e_2)}}_{\text{QUOTIENT}}$$

PARTIAL REMAINDER (MSBs)

| | | | | |
|---|---|---|---|---|
| 1111 | | | | |
| 1110 | | 0,12,13,14,15 | | |
| 1101 | | | | |
| 1100 | | | | |
| 1011 | | | 11,12,13,14,15 | 0,10,11,12,13 |
| 1010 | 0,12,13,14,15 | 0,12,13,14,15 | | |
| 1001 | | | 9,10,11,12,13 | 0,8,9,10,11 |
| 1000 | | 10,11,12,13,14 | | |
| 0111 | 11,12,13,14,15 | 8,9,10,11,12 | 6,7,8,9,10 | |
| 0110 | 9,10,11,12,13 | | | |
| 0101 | 0,8,9,10,11 | 0,6,7,8,9 | 0,4,5,6,7 | |
| 0100 | | 5,6,7,8,9 | | |
| 0011 | 3,4,5,6,7 | 2,3,4,5,6 | | |
| 0010 | | | | |
| 0001 | | 0,0,1,2,3 | | |
| 0000 | | | | |
| | 00 | 01 | 10 | 11 |

DIVISOR (MSBs)

FIG. 3

| MULTIPLE | FIRST SUMMAND | SECOND SUMMAND | THIRD SUMMAND |
|---|---|---|---|
| 0 | 0 | 0 | 0 |
| 1 | 0 | 0 | 1 |
| 2 | 0 | 2 | 0 |
| 3 | 0 | 2 | 1 |
| 4 | 4 | 0 | 0 |
| 5 | 4 | 0 | 1 |
| 6 | 4 | 2 | 0 |
| 7 | 4 | 2 | 1 |
| 8 | 8 | 0 | 0 |
| 9 | 8 | 0 | 1 |
| 10 | 8 | 2 | 0 |
| 11 | 8 | 2 | 1 |
| 12 | 8 | 4 | 0 |
| 13 | 8 | 4 | 1 |
| 14 | 16 | 2# | '1 |
| 15 | 16 | '1 | 1# |

FIG. 4

A = 1.50   B = 1.25   (DECIMAL)
 = 1.1000   = 1.0100   (BINARY)

COMPUTE A ÷ B = 1.50 / 1.25

STEP 1: COMPARE A & B TO CHOOSE 0 OR 1 AS THE FIRST DIGIT (TO THE LEFT OF THE DECIMAL POINT).

A > B, SO CHOOSE 1

STEP 2: SUBTRACT B FROM A TO GET REMAINDER (UNSHIFTED).

```
  1.1000
 -1.0100
  0.0100
```

STEP 3: SHIFT REMAINDER BY 4 BITS (SHIFT BY N WHERE $2^N$ = R; R IS THE RADIX).

0100.000 = REM
( = 4)

STEP 4: PERFORM LOOK-UP TO OBTAIN MULTIPLES.

FROM FIG. 2, USE:
2 , 3 , 4

```
 100.00  |  100.00  |  100.00
-010.10  | -011.11  | -101.00
  POS.   |   POS.   |   NEG.
```

STEP 5a: MULTIPLY B BY EACH MULTIPLE AND SUBTRACT THE RESULT FROM REM.

STEP 5b: SELECT THE LARGEST MULTIPLE THAT YIELDS A POSITIVE NUMBER IN STEP 5a AS THE QUOTIENT.

SO, SELECT 3 AS THE QUOTIENT DIGIT

STEP 6: CALCULATE THE NEXT REMAINDER USING THE SELECTED QUOTIENT FROM STEP 5b.

FIG. 5

COMPUTER FOR PERFORMING NON-RESTORING DIVISION

The present application is related to copending application Ser. No. 08/657,779 filed May 31, 1996 entitled, "A Novel Division Algorithm For Floating Point Or Integer Numbers", which application is assigned to the assignee of the present application.

FIELD OF THE INVENTION

This invention relates generally to the field of computer arithmetic; specifically, to computer implemented methods and circuits for dividing floating point or integer numbers.

BACKGROUND OF THE INVENTION

Computer implemented algorithms for performing arithmetic operations have existed since the advent of computers. Most often, these algorithms represent a sort of binary version of the paper-and-pencil method taught in elementary school. Many of the algorithms differ according to the particular number system that is employed. For example, there are four common representations for N-bit numbers: signed magnitude, two's complement, one's complement, and bias. As one would expect, algorithms also differ based upon the type of operation performed (e.g., addition, subtraction, multiplication, division), the precision to be implemented, exception handling, and so on.

Division algorithms are generally classified into two types, restoring and non-restoring. Examples of both restoring and non-restoring types of division algorithms can be found in the book, "Computer Architecture—A Quantitative Approach", Second Edition, by Patterson and Hennesy, Appendix A, Morgan Kaufmann Publishers, Inc. (1996).

As practitioners in the field understand, restoring division algorithms get their name because when a subtraction step involving the divisor yields a negative result, the register containing the remainder is restored to its old value. Conversely, in non-restoring type division algorithms, the remainder does not have to be restored at any stage of the calculation.

Much effort in the field of computer arithmetic has been devoted to simplifying or minimizing the number of operations that must be performed. By way of example, in non-restoring SRT division an arithmetic logic unit (ALU) operation is normally performed at each step. (SRT is an acronym for Sweeney, Roberson, and Tocher, who originally proposed algorithms of this nature). SRT division is widely employed in computer systems such as those which include the popular Pentium® processor, manufactured by Intel Corporation.

Despite its popularity, SRT division is not without its complications. For instance, one drawback of SRT division is that quotient bits cannot be determined immediately as they can in ordinary non-restoring division. Another drawback is that the quotient is calculated in a redundant representation that typically requires relatively complex logic. Furthermore, in SRT division negative quotient values are needed which further add to the computational logic. Obviously, complications in the compute logic add delay to the calculating steps.

As an alternative to existing SRT and multiplicative algorithms, the present invention presents a computer that implements a novel division algorithm of the non-restoring type. The algorithm is well-suited for dividing floating point or integer numbers and enables implementing robust, simple and fast dividers. Moreover, the dividers are easy to verify and provide high speed performance compared to many existing computer designs. Additionally, the logic for calculating the next group of quotient bits is simplified and permits iteratively calculating N-bits of the quotient per cycle.

SUMMARY OF THE INVENTION

The present invention is a computer that performs division in either floating point or integer representation according to a novel algorithm. In one embodiment, the computer includes a means for subtracting a divisor from a dividend to generate a first intermediate result. A shifting means shifts the intermediate result by N-bits, where N is an integer and $2^N$ is equal to the radix, to obtain a remainder. After obtaining the remainder, a look-up table means is referenced. The table generates one or more multipliers based upon an upper-bit portion of the remainder in an upper-bit portion of the divisor.

A multiplying means is then utilized to multiply the divisor by each of the one or more multiples to generate a second intermediate result. A subtracting means subtracts from the remainder each of the secondary intermediate results to generate one or more corresponding third intermediate results. The current quotient digit is selected as the largest multiplier which corresponds to the third intermediate result having the smallest possible value (as among all of the third intermediate results). These same operations can then be repeated to calculate additional quotient digits. For each iteration the third intermediate subtraction results, that corresponds to the selected multiplier, is used as the partial remainder for the next iteration.

BRIEF DESCRIPTION OF THE DRAWINGS

The present invention will be understood more fully from the detailed description which follows and from the accompanying drawings, which however, should not be taken to limit the invention to the specific embodiments shown, but rather are for explanation and understanding only.

FIGS. 1A–1C illustrate various terms used in the field of computer arithmetic; particularly, in performing division.

FIG. 3 is a diagram showing bit ranges of the partial remainder and divisor and the corresponding quotient digit sets for logic minimization in accordance with one embodiment of the present invention.

FIG. 4 is a table which specifies formation of the divisor according to one embodiment of the present invention.

FIG. 5 is a simple numerical example of the steps involved in one possible implementation of the invented division algorithm.

DETAILED DESCRIPTION

Figure 2:
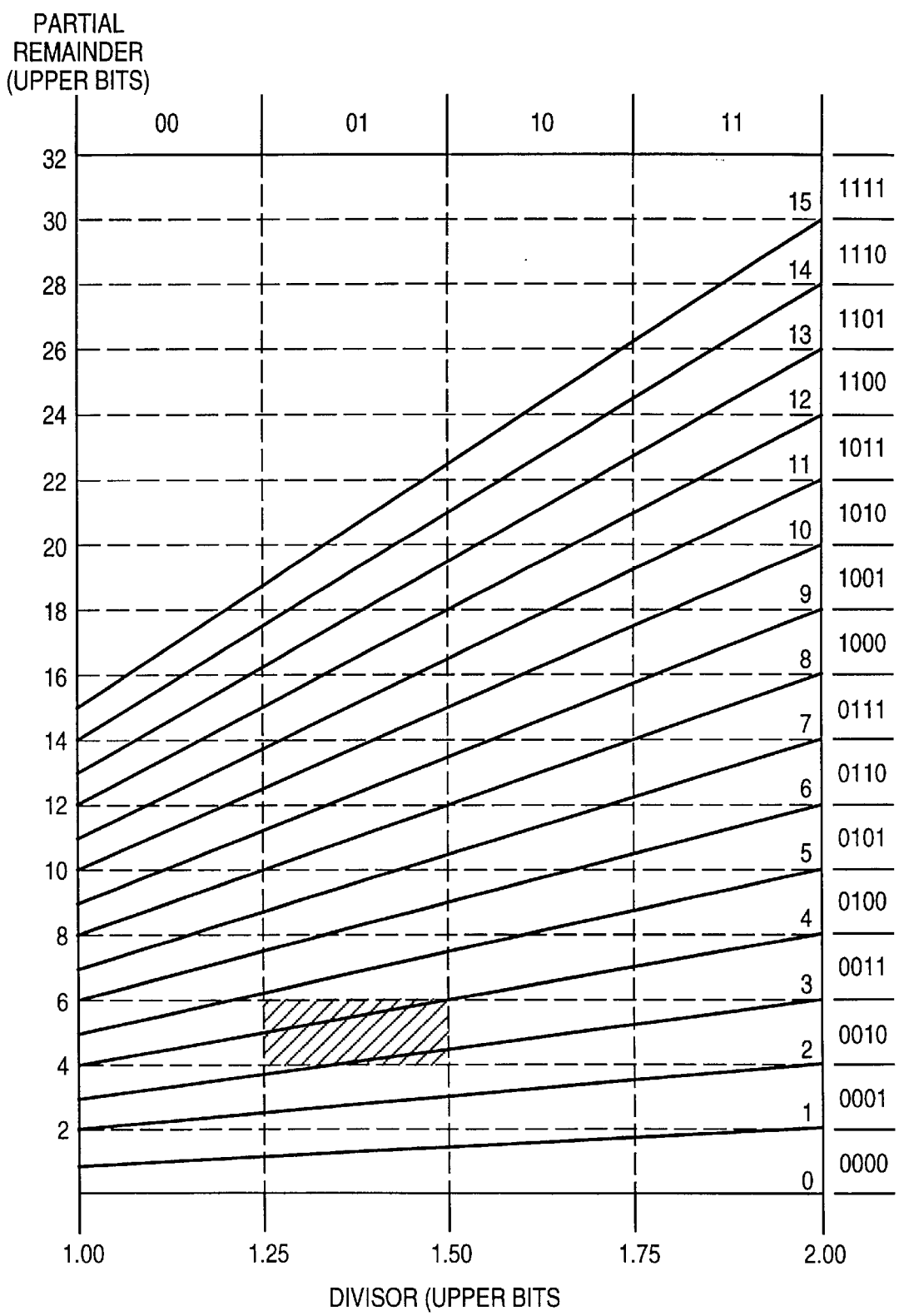
FIG. 2 shows the relationship between the partial remainder upper bits and the upper divisor bits used to evaluate the next quotient digit in accordance with the present invention.

A computer apparatus performing floating point or integer division is presented. The computer utilizes robust, simple, fast dividers in conjunction with a novel division algorithm. The proposed algorithm is of the non-restoring type, meaning that the remainder does not have to be restored at any stage in the calculation. Unlike common SRT algorithms, the quotient is not calculated in a redundant representation. This simplifies and speeds up the logic required for calculating the next group of quotient bits. The proposed algorithm is iterative, calculating N-bits of the results, per cycle, where N is an area/speed tradeoff.

Referring now to FIGS. 1A–1C, there are illustrated terms and numerical representations that will be used throughout the remainder of this specification. FIG. 1A shows a simple division example involving three digits: 24 is the dividend, which is divided by 8, the divisor. The result of this calculation is the number 3, i.e., the quotient digit.

FIG. 1B illustrates a non-integer representation that has gained widespread use in the field of computer arithmetic. This representation is known as floating point. In floating point representation, the computer word or number is broken into two parts: an exponent and a significand. As can be seen in FIG. 1B, the significand is the number 1.50, while the exponent is −3. The result of this calculation is 0.1875. The decimal part of a fractional number is commonly referred to as the mantissa.

The example of FIG. 1C illustrates how most floating point division algorithms are carried out. That is, the quotient is typically calculated by dividing the two significands, with the exponent portion being calculated by a simple subtraction. Thus, in the example of FIG. 1C the quotient value is given by $(S_1/S_2)$, whereas the exponent portion is simply $2(e_1-e_2)$.

Although the present invention will be described in particular embodiments utilizing floating point representations, it should be understood that the present invention is also applicable to integer division. Integer division may be performed in accordance with the present invention by first normalizing the integer values, and then proceeding with the steps described below. Practitioners in the art will further appreciate that the proposed division algorithm is well-suited for a variety of floating point representations, including the format specified by IEEE standard 754-1985 (also International Standard, IEC 559). This format is described in "A Proposed Radix-Hand Word-Length-Independent Standard for Floating-Point Arithmetic" IEEE Micro 4:486-100, Cody, et al. (1984).

The invented division algorithm is based on the following iterative formula.

$$Pr(i+1)=RADIX*Pr(i)-D*Q(i+1)$$

where Pr(i) is the partial remainder in the i'th iteration, D is the divisor and Q(i+1) is the quotient digit currently being calculated. An example of this algorithm is demonstrated below (see FIG. 5) in a version which calculates four quotient bits per clock (radix 16). It should be appreciated, however, that the algorithm is quite generalized and can be extended to more (or less) bits per cycle. The calculation is iterative and continues until the required precision has been achieved or the remainder reaches zero. The latency is thus the width of the mantissa divided by four. (An additional cycle is typically needed for the rounding action.)

According to the invention, at each clock cycle of the computer system the upper bits of the partial remainder are inspected along with the upper bits of the divisor to determine the possible values of the next quotient digit. The number of bits that are inspected depends upon the maximum number of possible values permitted. In the example provided below, four most significant bits (MSBs) are inspected for the partial remainder and two MSBs are inspected for the divisor. This yields up to five possible quotient digit values. Note that since the divisor is typically normalized it is always in the range of 1–2. This means that its most significant bit is always one, so that the actual bits inspected are the two bits immediately following the decimal point (i.e., to the right of the decimal point).

Those persons familiar with computer arithmetic will appreciate that tradeoffs can be made between the total number of bits inspected from the divisor and from the partial remainder, as well as the number of possible quotient digits out of the radix possible.

With reference now to FIG. 2, there is shown graphically the relationship between the partial remainder upper bits and the upper divisor bits. The horizontal scale is for a normalized divisor, as in a floating point divider where the divisor is always in the range of 1–2. Of course, for integer dividers, the divisor would be pre-normalized to fall within such a range. The vertical divisions in the graph of FIG. 2 correspond to the number of divisor MSBs chosen. In the example shown, two most significant bits are to be inspected to evaluate the next quotient. Thus, there are four distinct divisor regions corresponding to the bits 00, 01, 10 and 11. By restricting the number of bits that are inspected, the size of the table shown in FIG. 2 is restricted and the speed at which the calculation is performed is increased.

The vertical scale for the radix, for example, extends from 0 to 32 (as the partial remainder lies in the range of $0–2^1$). After being multiplied by the radix (16 in our example) as per the above equations, this covers the range 0–32. The divisions on the vertical scale (16 of them) correspond to the number of partial remainder MSBs (4 bits) chosen for the purpose of evaluating the next quotient. Hence, the sixteen vertical regions correspond to the binary numbers 000–1111, as shown along the right hand side of FIG. 2.

The possible quotient digit results are shown in FIG. 2 as being from 0–15. These are the lines which mark the regions for each value of the quotient bits. For instance, the line which extends from the partial remainder value 1 to the partial remainder value 2, and across the divisor upper bit values 1–2, marks the area where the correct quotient value is zero. Similarly, the area between the lines marked 1 and 2 (along the vertical axis) is the one in which the divisor and remainder values produce a quotient digit of 1. The area above the line extending from a partial remainder value of 15 to 30, and across the full range of the divisor bits, produces a correct quotient of 15.

During each iteration of the invented division algorithm, a table containing information such as that shown in FIG. 2 is accessed to determine how many times the divisor "fits" into the present or current remainder. Consider, for example, the case in which the upper partial remainder bits are 0010 and the divisor upper bits are 01. A table look-up (e.g., to a ROM containing the values shown in FIG. 2) produces probable quotient digit results of 2, 3 or 4. This is shown by the shaded region in FIG. 2. In other words, because a decision has been made to pick the correct quotient value based upon reduced precision versions of the divisor and the partial remainder, the shaded region of FIG. 2 encompasses several values of the quotient that may provide the correct quotient digit value. In this respect, each of the rectangular regions of FIG. 2 can be thought of as representing a zone of uncertainty, since at this stage of the algorithm it is not known exactly which quotient will fit into the remainder without producing a negative next remainder.

The regions are designed so that, at most, up to N possible candidates are selected. The number of candidates is the function of the number of bits used in the look-up, and can be minimized by judicious selection of the regions. According to one embodiment of the invention, up to five values are determined in each clock. These values represent all of the possible (i.e., a superset) quotient digits for the current iteration.

Once all of the five possible quotient bit-values have been generated from the table look-up, all five multiples of the divisor by those values are calculated, and then subtracted from the current partial remainder in a parallel operation. The result yielding the smallest positive result is then chosen as the correct value for the current quotient digit. The corresponding subtraction result is the new partial remainder for the next iteration. To restate it differently, the algorithm picks the largest multiple (i.e., multiplier) from the table (e.g., FIG. 2) that still provides a positive result following subtraction. Based on the number of bits that are inspected for both the partial remainder and the divisor, the table look-up generates all of the quotient bit values that—when multiplied by the divisor—are likely to fall within the quotient domain.

FIG. 3 illustrates quotient digit sets for various values of the partial remainder and divisor according to one embodiment of the present invention. As can be seen, five possible values for the next digit are always provided by the table represented by FIG. 3—even when the actual range of possible values may be smaller. For instance, in some situations a zero ("0") multiplier is used, whereas in other cases, redundant values are input. This embodiment permits minimization in the control logic and minimization of the required multiplexer network. In other words, even though only one or two values need be provided (depending upon a particular partial remainder and divisor values), five multipliers are always generated (see FIG. 3) so that various logic minimizations can be achieved. Note that in FIG. 3, different zones are combined into larger areas. By way of example, whenever the partial remainder upper bits falls in the range 1100–1111, the values 0, 12, 13, 14, 15 are always produced, irrespective of the divisor MSBs.

To better understand how division is performed according to the present invention, consider the example presented in FIG. 5. In this example it is desired to divide A (=1.5) by B (=1.25). Both the decimal and binary representations of these values are shown in FIG. 5. The initial step involves comparing the values of A and B to choose either 0 or 1 as the leading digit (to the left of the decimal point). This selection can be made simply by comparing A to B to determine which is larger. In this case, A is greater than B, so 1 is chosen as the leading or first digit.

In the second step, the divisor is subtracted from the dividend to generate an unshifted remainder. In our example, this subtraction step is shown below.

|  |
|---|
| 1.1000 |
| 1.0100 |
| 0.0100 |

Next, the remainder is shifted by 4-bit locations—basically multiplying the remainder by 16 in accordance with the radix of our computation. As can be seen below, this shifting step produces the remainder value 0100.000.

| 00000.010 | (before multiplying by the radix) |
|---|---|
| 00100.000 | (after shifting left by 4) |
| {0010} | --> the bits used in the look-up. |

After shifting, a memory containing the look-up table values is accessed to obtain the multipliers containing the correct quotient digit for the current iteration. Referring to the graph of FIG. 2, the partial remainder and divisor, for example, would produce values 2, 3 and 4. One of these values represents the correct quotient digit for the current iteration.

After the multipliers are obtained from the look-up operation each value is multiplied by the divisor, with the result being subtracted from the remainder. This yields three corresponding intermediate results. In our example, two of the results are positive and one is negative. According to the invented division algorithm, the largest multiplier that yields the smallest positive result is selected as the quotient digit. Applying this selection rule to the example of FIG. 5 means that "3" is selected as the quotient digit for the current iteration. The next partial remainder is calculated using the selected quotient, and the same process is repeated for the next iteration.

Practitioners in the art will appreciate that the proposed division algorithm offers a number of advantages compared with conventional SRT algorithms. One benefit is that the redundant representation of the quotient is avoided. Quotient bits are calculated directly, therefore they do not need to be later calculated into a final non-redundant form.

Look-up tables for the quotient selection are also smaller, with a whole range of possible tradeoffs in the selection and number of bits used for the look-up. Because the algorithm is numerically simple, error analysis is likewise easier to perform.

Perhaps the greatest advantage over conventional SRT algorithms is that the operating frequency according to the present invention is superior when a large number of quotient bits (e.g., more than three) are to be calculated per cycle. This is primarily due to the smaller number of bits used in the next quotient look-up table and the larger parallelism inherent in the algorithm. Compared with other prior art algorithm, such as multiplicative algorithms, the present invention may be implemented via a relatively simple network of multiplexers and adders. Because the algorithm is numerically simple, it also does not require expert numerical analysis or the use of a relatively large multiplier array.

One possibility for generating the quotient times divisor multiples is shown in the table of FIG. 4. All of the multiples of the divisor are produced in FIG. 4 by a summation of up to three shifted versions of the divisor. Thus, each of the multiples 0–15 can be produced by summing first, second and third summands. By way of example, the multiple 13 is produced by summing the divisor with the divisor shifted left by two places, and the divisor shifted left by three places. Mathematically this may be written as:

$$D \times 13 = D + D \times 4 + D \times 8$$

The table of FIG. 4 specifies how each multiple of the divisor may be formed in accordance with one embodiment of the invention. The numbers in the table denote multiples by that particular number. For example, the multiple "8" means 8*D (i.e., eight times the divisor). Practitioners in the art will readily appreciate that multiples by powers of two are relatively easy to generate as they are produced by simple shifts. Multiples by 14 and 15 are performed by subtraction from the multiple of 16. Subtraction is performed by addition of the inverted multiple (i.e., 1# or 2#) and the binary number one (i.e., '1).

Figure 6:
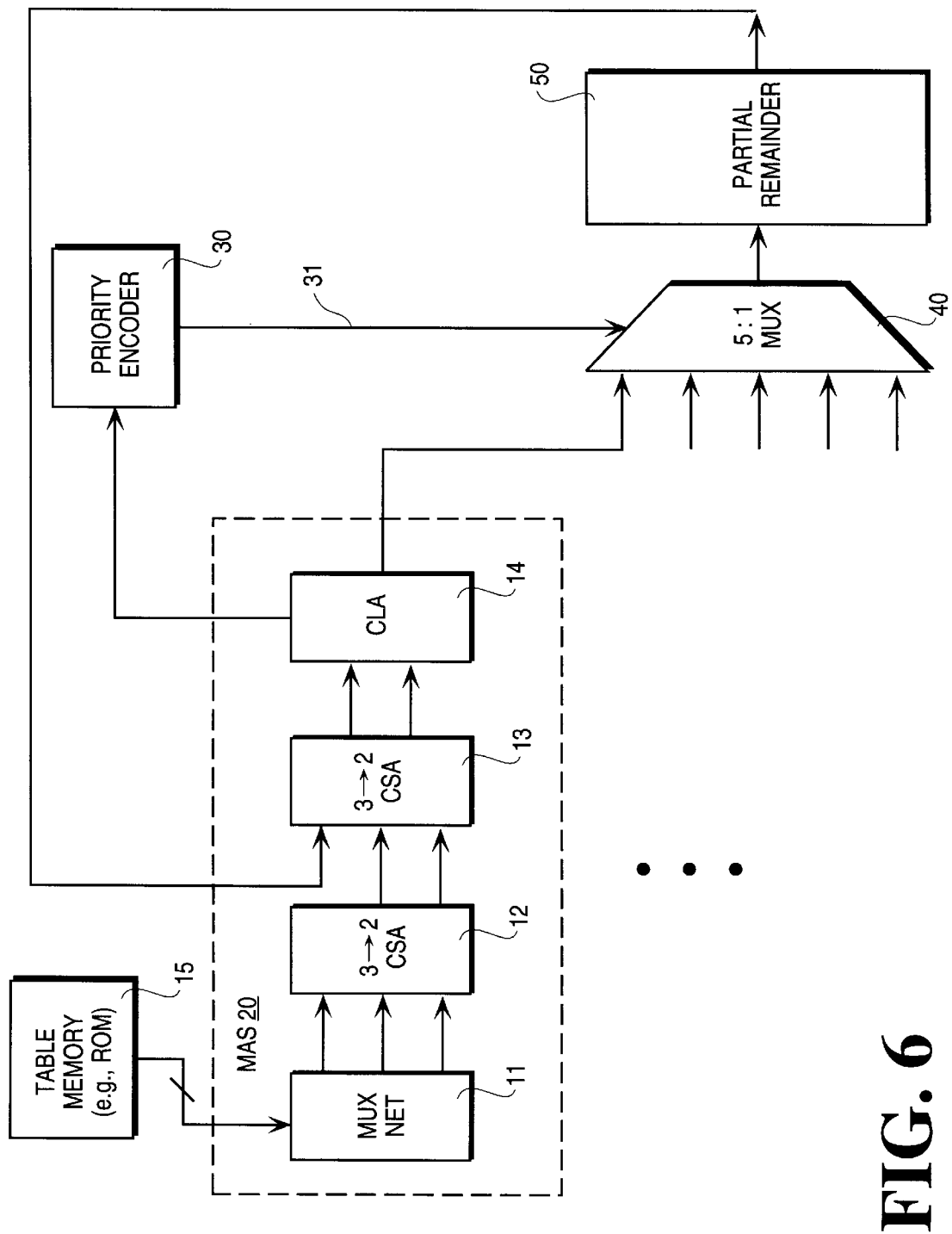
FIG. 6 is a block diagram of a circuit for dividing two numbers according to the present invention.

FIG. 6 is a circuit schematic block diagram showing one possible implementation of the division algorithm of the present invention. The illustrated embodiment selects five multiples in accordance with the look-up information shown in FIG. 3. These five multiples are produced by five multiply-and-subtract (MAS) units 20. In the embodiment of FIG. 6, 2 carry-save adders (CSAs) 12 and 13 are employed along with a carry-look-ahead adder (CLA) 14. (Carry-save adders are well known circuits that comprise a collection of N independent full adders). Each addition operation results in a pair of bits: a sum, and a carry bit.

To form the various multiples shown in the table of FIG. 4, up to three numbers need to be added (radix 16). Hence, a three input adder 12 is utilized with its three inputs being coupled to a multiplexer network 11 that produces the first, second, and third summands. Multiplexer network 11 provides the summand values listed in the table of FIG. 4 as inputs to carry-save adder 12. It should be apparent that the multiplexer for the first and third summand may be implemented using a 4:1 multiplexer stage, while a 5:1 multiplexer will suffice to produce the second summand.

The two stages of the 3:2 CSAs 12 and 13 are connected in series with CLA 14. CSA 12 produces the multiple of the divisor in a sum and carry form that is connected to the inputs of the CSA 13. The third input to CSA 13 is the current partial remainder of the iteration.

In FIG. 6, the partial remainder is shown being stored in a register 50. Thus, CSA 13 subtracts the multiple of the divisor from the partial remainder and again produces a sum and carry pair as outputs coupled to the inputs of CLA 14. The CLA, in turn, produces the next partial remainder, which is coupled to one input of a 5:1 multiplexer 40. Each MAS 20 produces a potential next partial remainder that corresponds to the multiple generated from the look-up. Each of the CLAs also produce a carry out signal that is input to the priority encoder 30.

Priority encoder 30 controls which partial remainder to select next, i.e., which result goes into the partial remainder register 50 for the next iteration. This is shown in FIG. 6 by control line 31 coupled to the select input of multiplexer 40. Priority encoder 30 also selects which quotient digit is selected as the correct digit for the current iteration. To make the quotient digit selection, priority encoder 30 controls another multiplexer (not shown in FIG. 6) that selects the correct quotient digit to be loaded into the appropriate location in the quotient result register. The quotient result register is shifted each iteration by the number of quotient bits computed, so that the currently computed bits are always inserted at the least significant bit locations. As explained previously, the correct quotient for the current iteration is the largest one that produces a multiple that still provides a positive result following subtraction from the remainder. Subtracting the quotient digit from the remainder produces the next partial remainder for the next iteration.

Practitioners in the art will appreciate that the present invention is flexible enough to compute a variety of different numbers of bits each clock cycle. For instance, if one wanted to compute five bits of the result per cycle—as may be the case in computing radix 32 computations—a circuit would be needed that could produce multiples ranging from 0 to 31. This could be achieved, for example, by summing four different numbers together.

Another possibility is to reduce the number of multipliers by choosing finer granularity in the table. In this respect, if three bits were used as the upper bits of the divisor, then the size of the columns (see FIG. 2) would be reduced in half. This, in turn, would reduce the number of multiples that need to be generated.

The computer of the present invention therefore allows a tradeoff: fewer bits may be used for both the partial remainder and divisor with faster look-up table access, but at the expense of more multiples. On the other hand, more bits may be used to reduce the number of multiples produced for each iteration, but at the expense of slower look-up circuitry. The benefits of the proposed division algorithm, however, provide advantages in both speed and circuit size over previous division methods.

I claim:

1. A computer that performs division comprising:
   means for subtracting a divisor from a dividend to generate a first intermediate result;
   means for shifting the first intermediate result by N-bits, where N is an integer and $2^N$ is equal to a radix, to obtain a remainder;
   look-up table means for producing one or more multipliers based upon a upper-bit portion of the remainder and an upper-bit portion of the divisor;
   means for multiplying the divisor by each of the one or more multipliers to generate second intermediate results;
   means for subtracting from the remainder each of the secondary intermediate results to generate one or more corresponding third intermediate results wherein a quotient digit is represented by a largest multiplier from the one or more multipliers which corresponds to a third intermediate result having a smallest positive value as the one or more third intermediate results.

2. The computer of claim 1 further comprising comparison means for comparing the dividend with the divisor to choose a quotient value to the left of the decimal point.

3. The computer of claim 1 wherein the look-up table means comprises a table of multipliers that provides up to five multipliers in each clock cycle.

4. The computer of claim 1 wherein N=4.

5. A circuit that generates a quotient value from a dividend and a divisor comprising:
   a network that produces sets of summands;
   a plurality of arithmetic units coupled to the network, each arithmetic unit summing a set of the summands to produce a multiple of the divisor and subtracting the multiple from a partial remainder to produce a next partial remainder output, the plurality of arithmetic units also producing a corresponding plurality of carry outputs;
   a first multiplexer having a plurality of inputs correspondingly coupled to the next partial remainder output of each arithmetic unit;
   a second multiplexer having a plurality of inputs correspondingly coupled to a plurality of digits;
   a priority encoder having inputs correspondingly coupled to the plurality of carry outputs, the priority encoder providing a first select signal to the first multiplexer to select a smallest, positive next partial remainder output as the partial remainder for a next iteration, the priority encoder also providing a second select signal to the second multiplexer to select one of the plurality of digits as a current quotient digit of the quotient value, one of the plurality of digits being equal to the multiple of the divisor that produces the smallest, positive next partial remainder.

6. The circuit of claim 5 wherein the arithmetic units each comprise multiply-and-subtract (MAS) units.

7. The circuit of claim 6 wherein the MAS units each comprise a carry-save adder (CSA) coupled to one of the sets of summands that produces the multiple.

8. The circuit of claim 7 wherein each of the MAS units further comprises a second CSA that subtracts the multiple produced by the first CSA from the partial remainder to generate a sum and carry result; and
   a carry look-ahead adder (CLA) coupled to receive the sum and carry result of the second CSA and produce the next partial remainder and carry outputs.

9. The circuit of claim 7 wherein the first and second CSAs each comprise 3:2 CSAs.

10. The circuit of claim 5 wherein the network includes a means for producing the sets of summands based upon an upper-bit portion of the partial remainder and an upper-bit portion of the divisor.

11. The circuit of claim 10 wherein the upper-bit portion of the partial remainder is equal to four bits, and the upper-bit portion of the divisor is equal to two bits.

12. The circuit of claim 11 wherein the means comprises a look-up table that provides up to five multipliers in each clock cycle.

* * * * *